July 11, 1961  F. M. ROGALLO ET AL  2,991,961
JET AIRCRAFT CONFIGURATION

Filed May 6, 1959  2 Sheets-Sheet 1

INVENTORS
FRANCIS M. ROGALLO
JOHN M. RIEBE
JOHN G. LOWRY

BY
ATTORNEYS

July 11, 1961  F. M. ROGALLO ET AL  2,991,961
JET AIRCRAFT CONFIGURATION

Filed May 6, 1959  2 Sheets-Sheet 2

FLAP
ANGLE       0°        30°        60°

INVENTORS
FRANCIS M. ROGALLO
JOHN M. RIEBE
JOHN G. LOWRY

BY
ATTORNEYS

United States Patent Office 2,991,961
Patented July 11, 1961

2,991,961
JET AIRCRAFT CONFIGURATION
Francis M. Rogallo and John M. Riebe, Newport News, and John G. Lowry, Hornsbyville, Va., assignors to the United States of America as represented by the Administrator of the National Aeronautics and Space Administration
Filed May 6, 1959, Ser. No. 811,509
4 Claims. (Cl. 244—12)
(Granted under Title 35, U.S. Code (1952), sec. 266)

The invention described herein may be manufactured and used by and for the Government of the United States for governmental purposes without the payment of any royalties thereon or therefor.

This invention relates generally to a jet-augmented flap system for aircraft, and more particularly to an upper surface external flow jet-flap configuration for a high wing airplane having improved noise suppression characteristics.

A jet-augmented flap may be defined in simple terms as an arrangement for simulating a flap by a jet sheet which augments the lift capabilities of an airfoil, or wing section, by inducing circulation of the stream around the wing. Although the advantage of these arrangements in providing higher lift and moment coefficients with the attendant reduction in the take-off and landing speed and distance of jet aircraft have been recognized by those skilled in the art, the arrangements heretofore proposed utilizing this principle have not been found to be entirely satisfactory in all respects. In one presently used external flow jet-flap arrangement, the engine nacelles are mounted on pods below the wing of the airplane and the jet exhaust thereof directed up through a slotted flap and then down over the upper surface of the flap. Although an increase in lift is obtained from this prior art configuration, a considerable part of the lift is lost in wing interference. This loss of lift has been determined to result from the forcing of the jet exhaust through the flap gap and the chordwise flow of the jet exhaust near the lower wing surface in a direction opposite to that necessary for circulation lift development. A further loss in lift is also experienced by this prior art low wing mounting position arrangement due to the "ground effect" phenomenon, which occurs when a jet-flap is close to ground. Moreover, this structural configuration lacks an inherent capability for effecting a reduction in the jet engine noise, and requires the utilization of separate jet noise supressing devices. An additional shortcoming in the low mounting position arrangement is its susceptibility to operational malfunctioning or structural damage from "garbage inhalation."

Accordingly, it is a feature of this invention to provide a new and improved jet-augmented flap configuration for reducing the danger of "trash ingestion," diminishing the "ground effect" upon the lift, improve the slow-speed performance of jet aircraft, and effect substantial jet-noise suppression.

It is an object of the present invention to provide a new and improved jet-flap aerodynamic configuration for blowing a jet stream over the trailing edge flap of the wing section of a jet aircraft.

Another object of the instant invention is the provision of a new and improved shielding flap-type jet engine noise suppressor.

Still another object of this invention is to provide a high wing airplane having its engines externally mounted in a cluster in a forward location on the upper wing surface and exhausting through a narrow rectangular slit along the surface of a flap.

A further object of the present invention is to provide a new and improved jet-augmented shielding-flap arrangement for effecting a beneficial change in the noise radiation pattern and spectrum, especially in the downward direction.

Other objects and many of the attendant advantages of this invention will be readily appreciated as the same becomes better understood by reference to the following detailed description when considered in connection with the accompanying drawings wherein.

Figure 1:
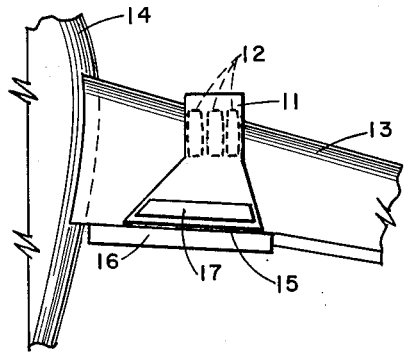
FIG. 1 is a fragmentary plan view of a jet-augmented flap configuration constructed according to the instant invention.

Referring now to the drawing wherein like reference characters designate the same or corresponding parts throughout the several views, and more particularly to FIG. 1 whereon a nacelle 11 enclosing a number of jet engines 12 in a cluster is shown as being externally mounted at an inboard location upon a swept wing 13 of a high-wing aircraft having a fuselage 14. The inboard cluster arrangement of a number of jet engines in a single nacelle provides an advantage over an equal number of jet engines spatially positioned on a wing in that a considerable reduction in the diving moment is realized by this cluster arrangement, however it is to be understood that if additional thrust is required, it is within the scope of this invention to provide for additional clusters of engines on the wing. The jet engines 12 are preferably mounted in a forwardly position on the wing and exhaust through a narrow rectangular opening, or slit, 15 formed in the rear of the nacelle 11 onto the upper surface of an inboard trailing edge flap 16, when in an extended position. The exhaust slit 15 is oriented on the wing in a manner to provide for the streamwise flow of the jet exhaust thereby to increase the thrust during level flight of the aircraft. The nacelle 11 may be mounted entirely above the wing 13 or partially submerged in the upper surface thereof, as shown in the drawing. A trap-door type of thrust reversal, or spoiler, vane 17 is provided in the nacelle 11 and normally forms a wall thereof, the operation of which will be more fully explained hereinafter.

It will be clear that without departing from the scope of the invention, the trailing edge flap 16 may either have a curved or plane configuration, and may either be of a partial or full span length. To provide the greatest lift during an all-engines-out emergency condition, the flap 16 is preferably of the slotted type.

Figure 2A:
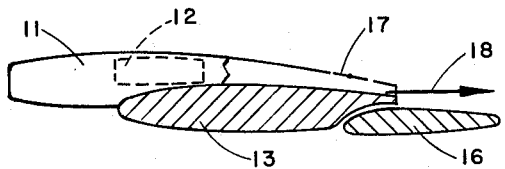
FIGS. 2A, 2B and 2C are cross-sectional side views of the jet-flap configuration of FIG. 1 in different operational positions.
Figure 2B:
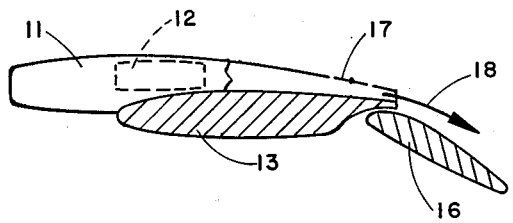
Figure 2C:
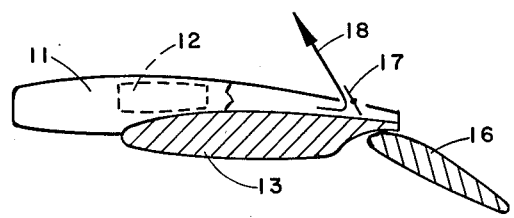

As shown in FIG. 2A of the drawing, during level, or cruising, flight of the aircraft, the trap-door vane 17 is in a retracted position and the trailing edge flap 16 in a flap-zero cruise position thereby providing for the undeflected rearward streamwise flow of the jet stream from the cluster of jet engines 12, as represented by the arrowhead 18. During slow flight of the aircraft, as in landing or take-off, the lift capability of the wing 13 is increased by deflecting the flap 16 as shown in FIG. 2B, thereby deflecting the direction 18 of the jet stream downwardly. For the purpose of increasing the drag and reducing the lift, as on landing touchdown, the trap-door vane 17 is moved into the path of travel of the jet stream thereby to deflect the jet stream upward and forward, as indicated by the arrowhead 18 in FIG. 2C.

In addition to providing an increase in lift, the jet-augmented flap configuration hereinbefore described also has been found to provide a considerable suppression of the jet engine noise during take-off and landing, particularly in the downward direction. The nature of the noise suppression provided is of especial benefit to ground observers as well as the occupants of the aircraft.

Figure 3:
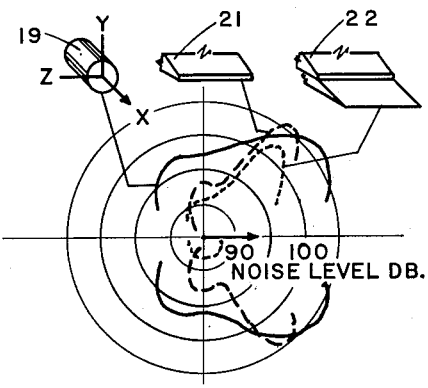
FIG. 3 is a graphical representation of the noise radiation patterns of divers exhaust nozzle configurations in the XY plane.
Figure 4:
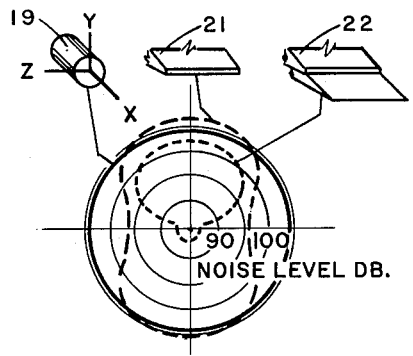
FIG. 4 is a graphical representation of the noise radiation patterns of divers exhaust nozzle configurations in a plane parallel to the YZ plane; and, FIG. 5 is a graphical representation of the noise radiation pattern of the jet-flap configuration according to the present invention at divers flap angles.

By way of comparison, FIG. 3 shows the overall noise radiation patterns in the XY plane for a circular exhaust nozzle and a rectangular exhaust nozzle having a large length to width ratio, both with and without a large flap. Each of the nozzles is considered to have an equivalent exit area. The pattern for the circular jet 19 may be seen as being symmetrical about the exhaust axis and as having its maximum radiation occurring about 40 degrees off the jet axis downstream of the nozzle. In the case of the conventional rectangular slit exhaust nozzle 21, a symmetrical noise pattern is also seen to occur, but is somewhat diminished in the upstream direction. When the jet exhaust from a rectangular nozzle attaches to and flows over a large flap, this configuration being represented by reference numeral 22, the noise pattern may be seen as being very unsymmetrical about the jet exhaust axis. It therefore will be apparent that large noise reductions result especially in the downward direction thereby benefitting both a ground observer as well as an occupant of the high-wing aircraft. Similar beneficial noise suppression occurs with the rectangular nozzle and attached flap configuration 22 in a plane parallel to the YZ plane, as shown in FIG. 4.

In addition to the beneficial changes in the noise radiation pattern resulting from the rectangular nozzle-flap configuration 22, equally beneficial changes in the noise spectrum also result by reason of this configuration. Although it has been heretofore recognized by those skilled in the art that a change from a circular exhaust area to a rectangular slit exhaust area produces a shift in the acoustic energy to the higher and less detectable frequencies, with sizable reductions in the low frequency end of the spectrum, this shift was accompanied by an increase in the noise level at the higher frequencies. By the use of the rectangular nozzle-flap configuration according to this invention, large reductions at the high end of the acoustic spectrum also occur. This result is considered to result from the acoustic shielding effect provided by the upper surface of flap 16 and to the beneficial effects of flow attachment.

Figure 5:
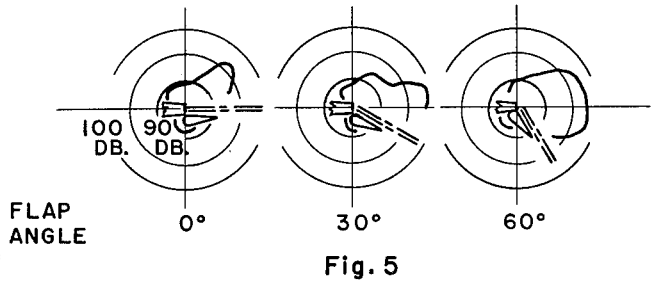

FIG. 5 graphically illustrates the effect on the noise pattern resulting from the turning of the jet stream, as in FIG. 2B for lift augmentation. It will be noted from the noise patterns of FIG. 5 that turning the jet stream through the angles of 0 degree, 30 degrees, and 60 degrees causes the noise patterns to be rotated an approximately equal amount. Consequently, since the upper noise radiation lobe rotates downward the more the jet stream is deflected, care should be exercised in the use of large deflection angles if the beneficial reductions in the downward direction of the noise pattern are to be fully realized.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In an aircraft, a fuselage, a wing carried high by said fuselage, a plurality of jet engines arranged in a cluster mounted on the upper surface of said wing, a nacelle enclosing said plurality of jet engines, a rectangular orifice formed in said nacelle for normally effecting a rearward ejection of the jet exhaust developed by said plurality of jet engines, means adjacent said orifice for selectively interrupting said rearward ejection and for deflecting the direction of flow of said jet exhaust, and a trailing edge flap over which said jet exhaust is directed to flow by said orifice when said flap is in an extended and deflected position.

2. In an aircraft, a fuselage, a swept wing carried high by said fuselage, a preselected number of jet engines arranged in a cluster mounted inboard on the upper surface of said swept wing, a nacelle enclosing said jet engines, a slit having a narrow rectangular configuration formed in said nacelle for normally directing the jet exhaust developed by said jet engines in a rearward streamwise flow, a pivoted vane formed in the upper surface of said nacelle adjacent to said slit for selectively redirecting the normal rearward flow of said jet exhaust in an upward and forwardly direction, and an inboard trailing edge flap carried by said wing over which said jet exhaust is directed to flow by said slit when said flap is in an extended and deflected position.

3. In an aircraft according to claim 2 wherein said nacelle is mounted partially submerged in the upper surface of said swept wing.

4. In an aircraft according to claim 3 wherein said trailing edge flap is of a partial span in length.

References Cited in the file of this patent

UNITED STATES PATENTS 2,396,911  Anxionnaz et al. _____ Mar. 19, 1946

FOREIGN PATENTS 1,178,843  France _____ Dec. 15, 1958